(12) United States Patent
Chiba

(10) Patent No.: US 12,415,530 B2
(45) Date of Patent: Sep. 16, 2025

(54) DRIVING OPERATION DETERMINER, DRIVING OPERATION DETERMINATION SYSTEM, DRIVING OPERATION DETERMINATION METHOD, AND STORAGE MEDIUM STORING PROGRAM

(71) Applicant: TOYOTA JIDOSHA KABUSHIKI KAISHA, Toyota (JP)

(72) Inventor: Ryoichi Chiba, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 204 days.

(21) Appl. No.: 18/212,221

(22) Filed: Jun. 21, 2023

(65) Prior Publication Data

US 2024/0034342 A1 Feb. 1, 2024

(30) Foreign Application Priority Data

Aug. 1, 2022 (JP) .................. 2022-122997

(51) Int. Cl.
*B60Q 1/34* (2006.01)
*B60W 30/18* (2012.01)
(Continued)

(52) U.S. Cl.
CPC .............. *B60W 50/10* (2013.01); *B60Q 1/34* (2013.01); *B60W 30/18163* (2013.01); *B60W 2520/14* (2013.01)

(58) Field of Classification Search
CPC ... B60Q 1/34; B60W 50/10; B60W 30/18163; B60W 2520/14; B60W 2520/10; B60W 2540/18; B60W 2540/20; B60W 40/09
(Continued)

(56) References Cited

U.S. PATENT DOCUMENTS

2003/0156015 A1 8/2003 Winner et al.
2006/0089801 A1\* 4/2006 Sawamoto ............ B60W 30/16
701/1
(Continued)

FOREIGN PATENT DOCUMENTS

JP 2004-523772 A 8/2004

OTHER PUBLICATIONS

Yang Zheng et al., "Lane-Change Detection From Steering Signal Using Spectral Segmentation and Learning-Based Classification", IEEE Transactions on Intelligent Vehicles, vol. 2, No. 1, Mar. 2017.

*Primary Examiner* — Rachid Bendidi
*Assistant Examiner* — Hossam M Abd El Latif
(74) *Attorney, Agent, or Firm* — Dinsmore & Shohl LLP

(57) ABSTRACT

A driving operation determiner that is configured to: based on lever operation information representing whether or not a turn signal lever of a vehicle is operated, and based on yaw rate information representing a yaw rate of the vehicle, make a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

9 Claims, 12 Drawing Sheets

(51) Int. Cl.
*B60W 40/09* (2012.01)
*B60W 50/10* (2012.01)

(58) Field of Classification Search
USPC .......................................................... 701/1
See application file for complete search history.

(56) References Cited

U.S. PATENT DOCUMENTS

| | | | |
|---|---|---|---|
| 2011/0071727 A1* | 3/2011 | Bechtler | ............... B62D 5/049 |
| | | | 701/29.2 |
| 2019/0143983 A1* | 5/2019 | Hashimoto | .......... G05D 1/0088 |
| | | | 701/23 |
| 2020/0247416 A1* | 8/2020 | Tsuji | ............... B60W 30/18163 |
| 2020/0324777 A1* | 10/2020 | Kato | ........................ B62D 6/00 |

* cited by examiner

FIG.5

| OPERATION SUBJECTS | SCENE | SPECIFIC DETECTION VALUES | EXTRACTION CONDITION | KPI |
|---|---|---|---|---|
| TURN SIGNAL LEVER | LANE CHANGE ON A HIGH-SPEED ROAD | VEHICLE SPEED, YAW RATE | FIRST EXTRACTION CONDITION | NUMBER OF TIMES CONDITIONS 1 TO 3 ARE SATISFIED |

DRIVING OPERATION DETERMINER, DRIVING OPERATION DETERMINATION SYSTEM, DRIVING OPERATION DETERMINATION METHOD, AND STORAGE MEDIUM STORING PROGRAM

CROSS-REFERENCE TO RELATED APPLICATION

This application is based on and claims priority under 35 USC 119 from Japanese Patent Application No. 2022-122997 filed on Aug. 1, 2022, the disclosure of which is incorporated by reference herein.

BACKGROUND

Technical Field

The present disclosure relates to a driving operation determiner, a driving operation determination system, a driving operation determination method, and a memory medium memorizing a program.

Related Art

Japanese National Publication No. 2004-523772 discloses a capability for detecting that a vehicle conducts a lane change while running along a road.

Japanese National Publication No. 2004-523772 does not enable detection that a vehicle conducts a lane change while running along a road with a curved shape.

SUMMARY

An aspect of the disclosure is a driving operation determiner that includes: a memory; and a processor coupled to the memory, the processor being configured to: based on lever operation information representing whether or not a turn signal lever of a vehicle is operated, and based on yaw rate information representing a yaw rate of the vehicle, make a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

BRIEF DESCRIPTION OF DRAWINGS

FIG. 5 is a diagram illustrating a scene list.

DETAILED DESCRIPTION

Figure 2:
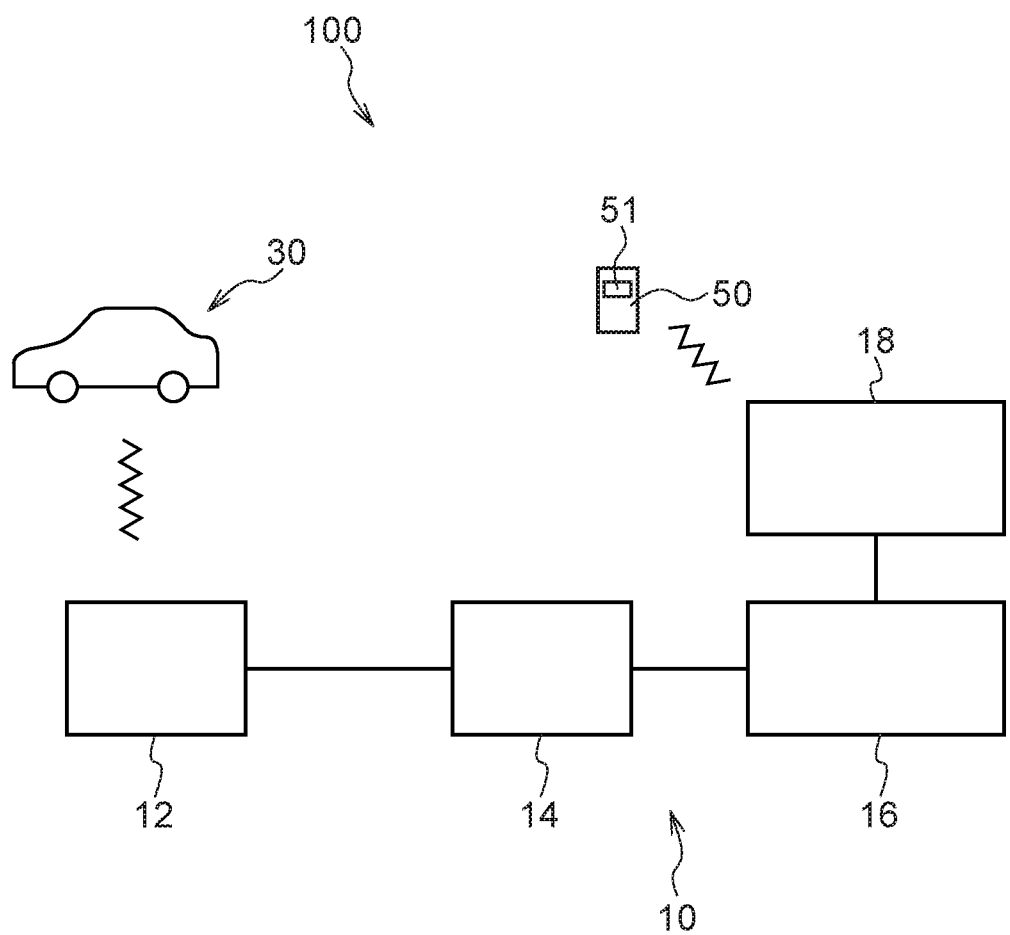
FIG. 2 is a diagram illustrating a driving assessment system that is provided with the driving assessment device, the vehicle and a portable terminal.

Below, an exemplary embodiment of a driving assessment device (a driving operation determiner) 10, a driving assessment system (a driving operation determination system) 100, a driving assessment method (a driving operation determination method) and a program according to the present disclosure is described with reference to the drawings. The driving assessment system 100 according to the present exemplary embodiment (below referred to as "the system 100") is provided with the driving assessment device 10, a vehicle 30 and a portable terminal 50 that are capable of wireless communications with one another, as shown in FIG. 2.

Figure 1:
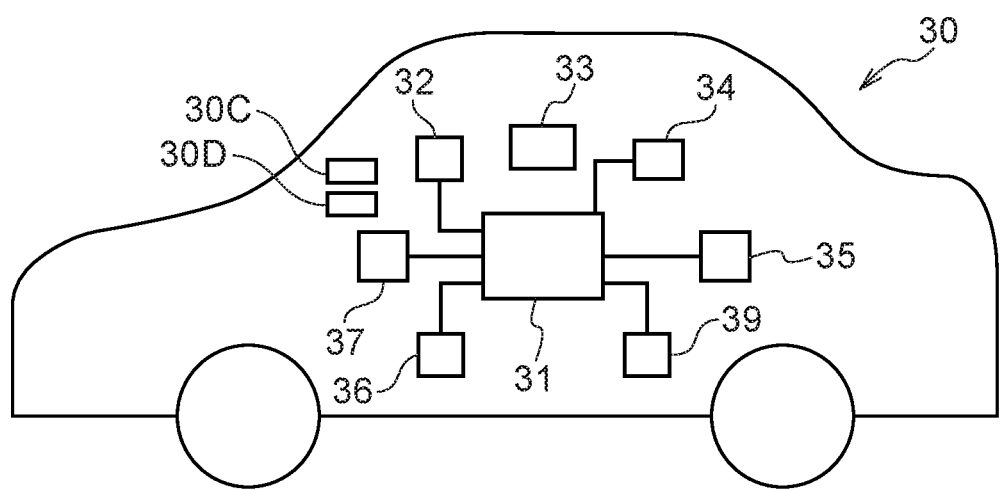
FIG. 1 is a diagram illustrating a vehicle capable of transmitting detection values to a driving assessment device according to an exemplary embodiment.

The vehicle 30 is capable of data communications with the driving assessment device 10 via a network. As shown in FIG. 1, the vehicle 30 includes an electronic control unit (ECU) 31, a vehicle speed sensor 32, a shift lever 33, a shift position sensor 34, a yaw rate sensor 35, a steering angle sensor 36, a turn signal switch (a lever position detection portion) 37 and a Global Positioning System (GPS) receiver 39. A vehicle ID is assigned to the vehicle 30, which may receive assessments by the driving assessment device 10. The vehicle speed sensor 32, shift position sensor 34, yaw rate sensor 35, steering angle sensor 36, turn signal switch 37 and GPS receiver 39 are connected to the ECU 31.

The ECU 31 includes a central processing unit (CPU), read-only memory (ROM), random access memory (RAM), storage, a communications interface (I/F), and an input/output interface. The CPU, ROM, RAM, storage, communications interface and input/output interface are connected with one another to be capable of communications via a bus. The CPU, ROM, RAM, storage, communications interface and input/output interface have similar structures and functions to, respectively, a CPU 12A, ROM 12B, RAM 12C, storage 12D, a communications interface 12E and an input/output interface 12F of a first server 12, which is described below. Details of these functions are described below. The network mentioned above encompasses communication networks of telecommunications carriers and internet networks. The vehicle 30, the first server 12 that is described below, a fourth server 18 and the portable terminal 50 perform data communications via this network.

The vehicle 30 further includes an accelerator pedal. When the accelerator pedal is pressed by a foot of a driver of the vehicle 30, a drive source of the vehicle 30 is controlled by the ECU 31. The drive source of the vehicle 30 encompasses one or both of an internal combustion engine and an electric motor.

The vehicle 30 further includes a steering wheel 30C. When the steering wheel 30C is operated by turning by a driver, a steering angle (and course angle) of the steering wheel 30C and steered wheels changes. The vehicle 30 also includes a turn signal lever (an indicator lever) 30D. The turn signal lever 30D is turnable from a predetermined neutral position (an initial position) to each of a first position at an upper side and a second position at a lower side. In the descriptions below, the first position and the second position are collectively referred to as operation positions.

The vehicle speed sensor 32 detects vehicle speeds of the vehicle 30. The shift lever 33 is movable to shift positions such as a D (drive) range (a forward running position), an R (reverse) range, a P (parking) range and an N (neutral) range. That is, the vehicle 30 is an automatic vehicle (AT vehicle). The shift position of the shift lever 33 is detected by the shift position sensor 34. As is widely known, when the shift lever 33 is at the D range, a gearing for forward running is formed. Therefore, when the shift lever 33 is at the D range, the vehicle 30 is capable of forward running under driving force of the drive source.

The yaw rate sensor 35 detects yaw rates of the vehicle 30. In the present Description, the plus (+) symbol indicates magnitudes of yaw angles in the counterclockwise direction of the vehicle 30 in plan view, and the minus (−) symbol indicates magnitudes of yaw angles in the clockwise direction. The steering angle sensor 36 detects steering angles of the steering wheel 30C. In the present Description, the plus (+) symbol indicates magnitudes of steering angles when the steering wheel 30C is turned in the counterclockwise direction as seen by a driver, and the minus (−) symbol indicates magnitudes of steering angles when the steering wheel 30C is turned in the clockwise direction.

The turn signal switch 37 detects positions of the turn signal lever 30D. For example, when the turn signal switch 37 detects that the turn signal lever 30D is disposed at the first position, a left side direction indicator (a lighting device) provided at the vehicle 30 is illuminated under the control of the ECU 31. On the other hand, when the turn signal switch 37 detects that the turn signal lever 30D is disposed at the second position, a right side direction indicator (lighting device) provided at the vehicle 30 is illuminated under the control of the ECU 31.

The GPS receiver 39 receives GPS signals transmitted from GPS satellites and thus acquires information relating to a position at which the vehicle 30 is running (below referred to as position information). Detection values from the vehicle speed sensor 32 (vehicle speed information), detection values from the shift position sensor 34, detection values from the yaw rate sensor 35 (yaw rate information), detection values from the steering angle sensor 36 and detection values from the turn signal switch 37 are associated with time information representing times that is acquired from a timer provided at the ECU 31 and with the position information, and the detection values are transmitted to the ECU 31 via a Controller Area Network (CAN) provided in the vehicle 30 and are stored at the storage of the ECU 31.

As shown in FIG. 2, the driving assessment device 10 is provided with the first server 12, a second server 14, a third server 16 and the fourth server 18. As an example, the first server 12, the second server 14, the third server 16 and the fourth server 18 are disposed within a single building. The first server 12 and the fourth server 18 are connected to the aforementioned network. The first server 12 and the second server 14 are connected by a local area network (LAN), the second server 14 and the third server 16 are connected by the LAN, and the third server 16 and the fourth server 18 are connected by the LAN. In other words, the driving assessment device 10 is configured as a cloud computing system.

Figure 3:
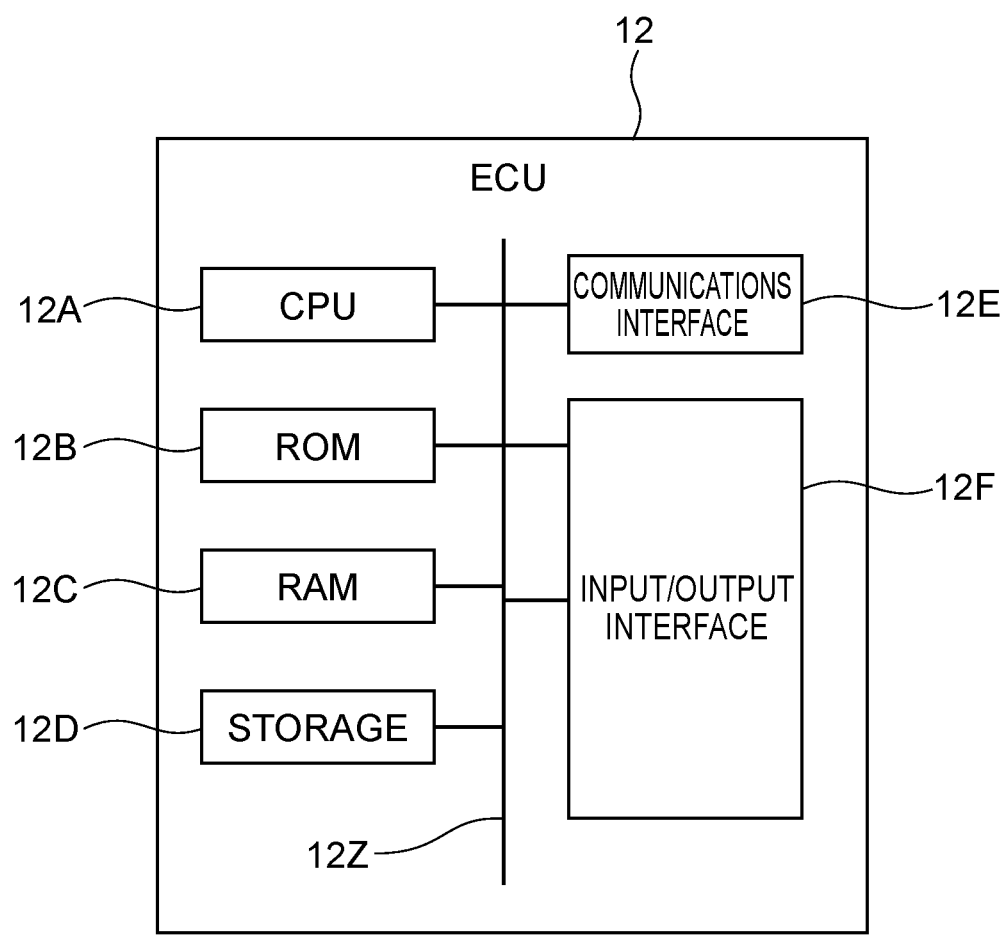
FIG. 3 is a control block diagram of a first server of the driving assessment device shown in FIG. 2.

As shown in FIG. 3, the first server 12 includes the central processing unit (CPU, which is a hardware processor) 12A, the read-only memory (ROM) 12B, the random access memory (RAM) 12C, the storage 12D, which are examples of a memory, the communications interface (I/F) 12E, and the input/output interface 12F. The CPU 12A, ROM 12B, RAM 12C, storage 12D, communications interface 12E and input/output interface 12F are connected with one another to be capable of communications via a bus 12Z. The first server 12 is capable of acquiring information relating to dates and times from a timer.

The CPU 12A is a central arithmetic processing unit that executes various programs and controls respective parts. That is, the CPU 12A reads a program from the ROM 12B or storage 12D and executes the program, using the RAM 12C as a work area. The CPU 12A controls configurations and performs various kinds of computation processing (information processing) in accordance with programs recorded in the ROM 12B or storage 12D.

The ROM 12B stores various programs and various kinds of data. The RAM 12C serves as the work area and temporarily memorizes programs and data. The storage 12D is structured with a memory device, which is an example of a non-transitory computer readable memory medium, such as a hard disk drive (HDD), a solid state drive (SSD) or the like. The storage 12D stores various programs and various kinds of data. The communications interface 12E is an interface for the first server 12 to communicate with other equipment. The communications interface 12E is capable of, for example, wireless communications with the vehicle 30 and the portable terminal 50. The input/output interface 12F is an interface for communicating with various devices.

Data representing detection values detected by the vehicle speed sensor 32, the shift position sensor 34, the yaw rate sensor 35, the steering angle sensor 36, the turn signal switch 37 and the GPS receiver 39 is referred to as detection value data. Between a start button provided at an instrument panel of the vehicle 30 being switched to an on state and the start button being switched to an off state, each time a predetermined duration passes, the detection value data is transmitted from the communications interface of the ECU 31 to the communications interface 12E of the first server 12 via the aforementioned network, and the detection value data is recorded at the storage 12D. When the start button is in the on state, the aforementioned drive source is in an operable state and the vehicle 30 is in a state capable of running. All of the detection value data recorded at the storage 12D includes information relating to the vehicle ID, time information and position information.x Basic structures of the second server 14, the third server 16 and the fourth server 18 are the same as the first server 12.

Figure 4:
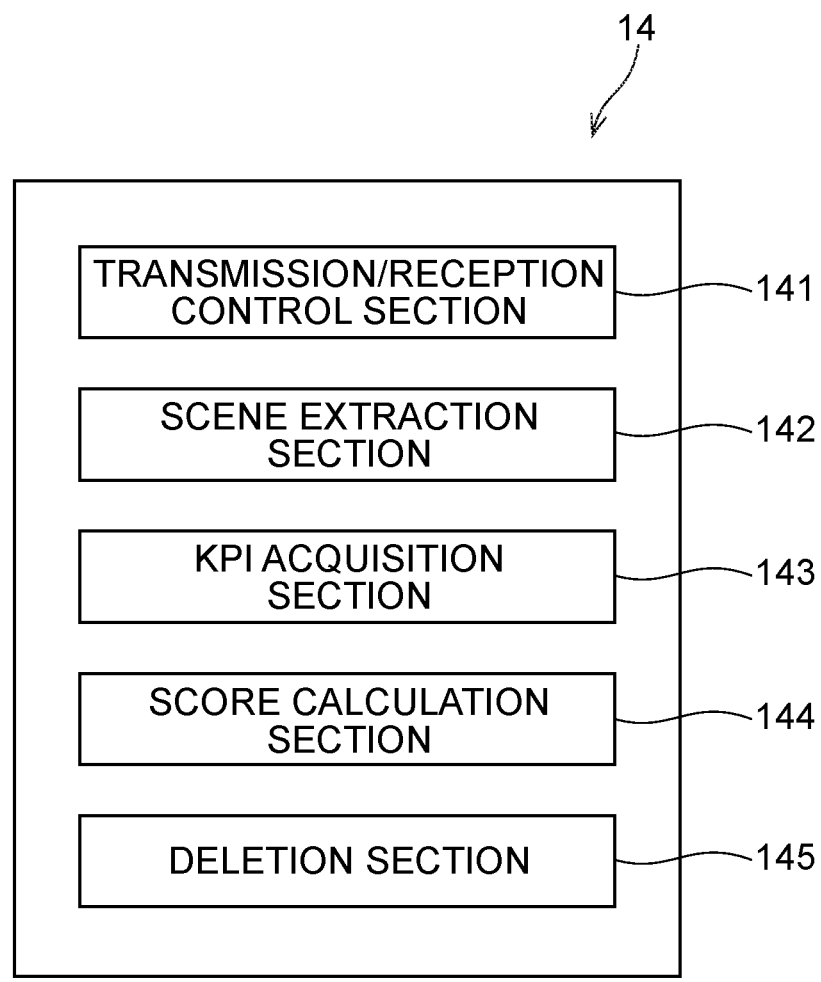
FIG. 4 is a control block diagram of a second server shown in FIG. 2.

FIG. 4 is a block diagram showing an example of functional structures of the second server (a computer) 14. As functional structures, the second server 14 includes a transmission/reception control section 141, a scene extraction section 142, a KPI acquisition section 143, a score calculation section 144 and a deletion section 145. The transmission/reception control section 141, scene extraction section 142, KPI acquisition section 143, score calculation section 144 and deletion section 145 are realized by the CPU of the second server 14 loading and executing a program memorized in ROM.

The transmission/reception control section 141 controls the communications interface of the second server 14. The communications interface of the second server 14 receives information from the communications interfaces of the first server 12 and the third server 16 via the LAN. The detection value data recorded at the storage 12D of the first server 12 is associated with the vehicle ID, time information and place information when being transmitted to the communications interface of the second server 14. The detection value data transmitted from the first server 12 to the second server 14 includes a data set acquired during a predetermined data detection duration. This data detection duration is, for example, 30 minutes. Below, a data set that corresponds with a single vehicle ID and is acquired in the data detection duration is referred to as a detection value data set. Detection value data sets recorded at the first server 12 are sequentially transmitted to the communications interface of the second server 14 in order from the oldest time of acquisition. More specifically, when a detection value data set has been deleted from the storage of the second server 14 as described below, a detection value data set that is newer than that detection value data set is transmitted from the first server 12 to the second server 14, and the newer detection value data set is stored at the storage of the second server 14

FIG. 5 shows a scene list 22, which is recorded at the ROM of the second server 14. The scene list 22 is defined in accordance with details of operations of various operation members of the vehicle 30.

Figure 7:
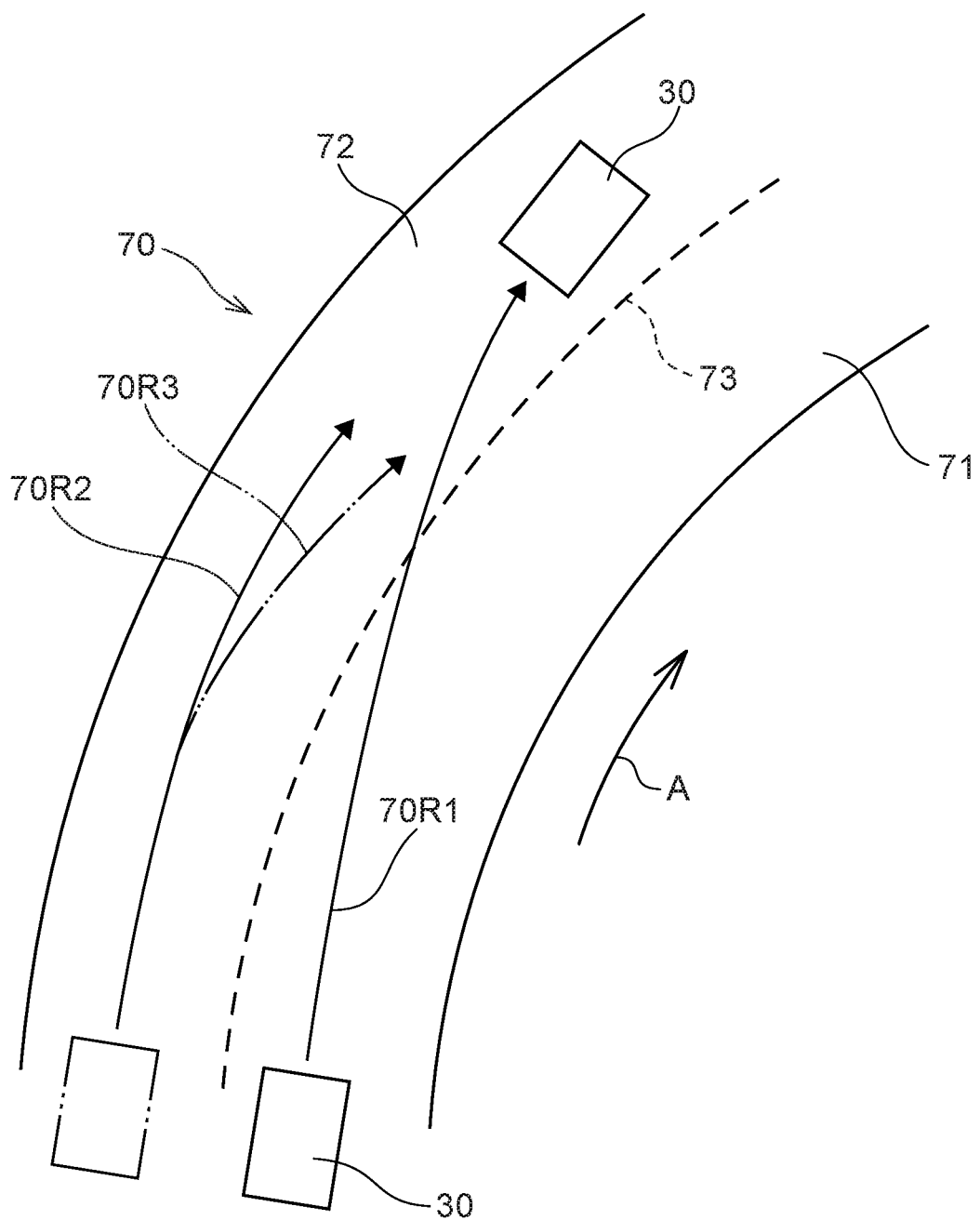
FIG. 7 is a schematic plan view illustrating a situation in which the vehicle is running along a high-speed road with a curved shape.

An operation subject relating to a first extraction condition included in the scene list 22 is the turn signal lever 30D. A scene relating to the first extraction condition is a lane change on a high-speed road. FIG. 7 shows, in plan view, a situation in which the vehicle 30 is running forward along a high-speed road 70 that is formed in a curved shape and includes two lanes 71 and 72. The lane 71 and lane 72 are divided by a dividing line 73. The high-speed road 70 is a one-way road on which vehicles may run only in the direction of arrow A. As an example, the first extraction condition relates to the scene shown in FIG. 7.

On the basis of the detection values from the turn signal switch 37, the scene extraction section 142 determines whether or not the scene start condition described below is satisfied.

Scene start condition: The turn signal lever 30D is moved from the neutral position (initial position) to an operation position.

Also on the basis of the detection values from the turn signal switch 37, the scene extraction section 142 determines whether or not a scene end condition is satisfied. The scene end condition is satisfied when condition 1 and condition 2 are fulfilled.

Condition 1: The turn signal lever 30D is moved from the operation position to the neutral position (initial position).

Figure 6:
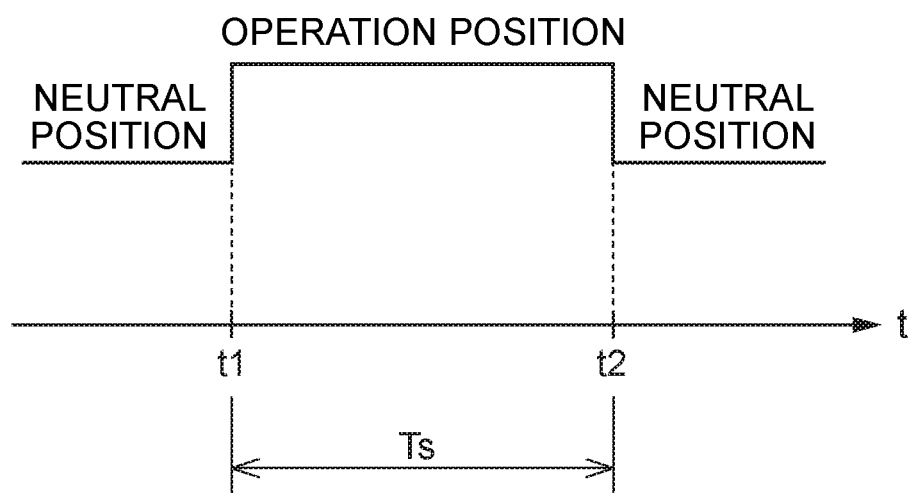
FIG. 6 is a timing chart illustrating changes of position of a turn signal lever.

Condition 2: A scene duration (an identified duration) Ts shown in FIG. 6 is longer than a predetermined duration (a fourth threshold value). A situation is anticipated in which the scene start condition is satisfied at a predetermined first time t1 and condition 1 is satisfied at a second time t2. A time period between the first time t1 and the second time t2 is the scene duration Ts. It is thought unlikely that the vehicle 30 would perform a lane change with the position of the turn signal lever 30D being switched from the neutral position to the operation position within a duration of the scene duration Ts that is the prespecified duration (the fourth threshold value) or less. The fourth threshold value is, for example, 1.5 s.

When the scene end condition is satisfied, the scene extraction section 142 distinguishes between data representing specific detection values and other data in a detection value data set stored at the storage. More specifically, the scene extraction section 142 extracts data detected by the vehicle speed sensor 32 and the yaw rate sensor 35 in the scene duration Ts from the detection value data set stored at the storage to be data representing specific detection values, which is data required for acquisition of a key performance indicator (KPI), which is described below.

On the basis of these specific detection values, the KPI acquisition section 143 acquires (calculates) a KPI corresponding to the first extraction condition. On the basis of the specific detection values extracted by the scene extraction section 142, which are detection values from the vehicle speed sensor 32 and the yaw rate sensor 35, the KPI acquisition section 143 makes a determination as to whether all of the following conditions 3 to 5, which are included in the first extraction condition, are satisfied. For example, all of conditions 3 to 5 are satisfied in a situation in which the vehicle 30 that is running forward along the lane 71 of the high-speed road 70 moves into the lane 72 along a running path 70R1 shown in FIG. 7. That is, the first extraction condition is satisfied in this situation. When the first extraction condition is satisfied, there is a high probability that the vehicle 30 is conducting a lane change while running forward.

Condition 3: A difference between a maximum value Ymax of the yaw rate of the vehicle 30 and a minimum value of the yaw rate is at least a first threshold value. For example, when the maximum value Ymax is (+) 0.2° and the minimum value is (−) 0.1°, the difference is (+) 0.3°. Regardless of whether the road the vehicle 30 is running on has a linear shape or a curved shape, the difference between the maximum value Ymax and minimum value Ymin of the yaw rate of the vehicle 30 when performing a lane change is likely to be the first threshold value or greater. The first threshold value is, for example, 0.7°.

Condition 4: The absolute value of the maximum value Ymax of the yaw rate of the vehicle 30 is at least a second threshold value. The second threshold value is, for example, 0.7°.

Condition 5: An average speed VA of the vehicle 30 in the scene duration Ts is at least a third threshold value. The third threshold value is a value that the average speed VA has a high probability of being equal to or greater than when there is no congestion on a road along which the vehicle 30 is running. For example, when the vehicle 30 is running along a road with a speed limit set to a predetermined value between 100 km/h and 120 km/h, the third threshold value is 80.0 km/h.

Extraction conditions that are different from the first extraction condition can be included in the scene list 22. These extraction conditions relate to scenes, specific detection values and KPIs in relation to, for example, the accelerator pedal and a brake pedal of the vehicle 30. Detailed descriptions in relation to these extraction conditions are not given here.

The score calculation section 144 calculates a driving operation score on the basis of calculated KPIs, as described below.

When the scene extraction section 142, the KPI acquisition section 143 and the score calculation section 144 complete the processing described above for one detection value data set recorded at the storage, the communications interface of the second server 14 transmits data relating to the acquired driving operation score together with information relating to the vehicle ID to the communications interface of the third server 16.

When the scene extraction section 142, the KPI acquisition section 143 and the score calculation section 144 complete the processing described above for the one detection value data set, the deletion section 145 deletes that detection value data set from the storage of the second server 14.

The communications interface of the third server 16 receives the data relating to the driving operation score that is transmitted from the second server 14. The data received by the communications interface of the third server 16 is recorded at the storage of the third server 16.

The fourth server 18 functions at least as a web server and a web app server. The communications interface of the fourth server 18 receives data transmitted from the communications interface of the third server 16 and records the received data at the storage of the fourth server 18.

The portable terminal 50 shown in FIG. 2 includes a CPU, ROM, RAM, storage, a communications interface and an input/output interface. The portable terminal 50 is, for example, a smartphone or a tablet-type computer. The CPU, ROM, RAM, storage, communications interface and input/output interface of the portable terminal 50 are connected with one another to be capable of communications via a bus. The portable terminal 50 is provided with a display unit 51 including a touch panel. The display unit 51 is connected to the input/output interface of the portable terminal 50. The display unit 51 may be a liquid crystal display, an organic electroluminescent display or the like.

The portable terminal 50 is carried by, for example, a driver of the vehicle 30 to which the vehicle ID is assigned. A predetermined driving assessment display application is installed at the portable terminal 50. The communications interface of the portable terminal 50 is capable of conducting wireless communications with the communications interface of the fourth server 18. That is, the communications interface of the portable terminal 50 is capable of transmitting and receiving data to and from the communications interface of the fourth server 18. Under the control of the CPU, the display unit 51 displays, for example, information that the communications interface of the portable terminal 50 receives from the communications interface of the fourth server 18 and information entered via the touch panel. The communications interface of the portable terminal 50 may transmit information entered by the touch panel to the communications interface of the fourth server 18.

Operation and Effects

Now, operation and effects of the present exemplary embodiment are described.

First, a flow of processing that is carried out by the CPU of the second server 14 (below referred to as "the second CPU") is described using the flowchart of FIG. 8. While the start button is in the on state, the second CPU executes the processing of the flowchart in FIG. 8 repeatedly, each time a predetermined duration passes.

In step S10 (the word "step" is omitted in the descriptions below), the second CPU of the second server 14 makes a determination as to whether the communications interface has received a detection value data set from the first server 12. That is, the second CPU makes a determination as to whether a detection value data set is recorded at the storage of the second server 14. The second CPU also makes a determination as to whether a predetermined condition is satisfied. An example of this predetermined condition is the scene end condition mentioned above.

When the result of the determination in S10 is Yes, the second CPU proceeds to S11, and the scene extraction section 142 extracts data representing specific detection values from the detection value data set saved at the storage. Then, the KPI acquisition section 143 acquires (calculates) a KPI on the basis of the extracted data representing the specific detection values.

For example, when the first extraction condition is satisfied, the KPI acquisition section 143 acquires a number of times that the first extraction condition is satisfied while the start button is in the on state as a KPI.

When the processing of S11 is complete, the second CPU proceeds to S12 and the score calculation section 144 calculates a driving operation score.

For example, when the number of times the first extraction condition has been satisfied is one or more, the score calculation section 144 sets a score relating to the first extraction condition to 1 point. On the other hand, when the number of times the first extraction condition has been satisfied is zero, the score calculation section 144 sets the score relating to the first extraction condition to 100 points.

When an extraction condition other than the first extraction condition is satisfied, the score calculation section 144 calculates a score according to a KPI of the corresponding operation subjects.

The score calculation section 144 calculates the driving operation score on the basis of the calculated scores. More specifically, the score calculation section 144 acquires a value (an average value) for which a total of the scores corresponding to the respective extraction conditions is divided by the number of extraction conditions (for example, three) to serve as the driving operation score.

When the processing of S12 is complete, the second CPU proceeds to S13 and the communications interface transmits data relating to the driving operation score together with information relating to the vehicle ID to the third server 16.

When the processing of S13 is complete, the second CPU proceeds to S14 and the deletion section 145 deletes this detection value data set from the storage of the second server 14.

Figure 8:
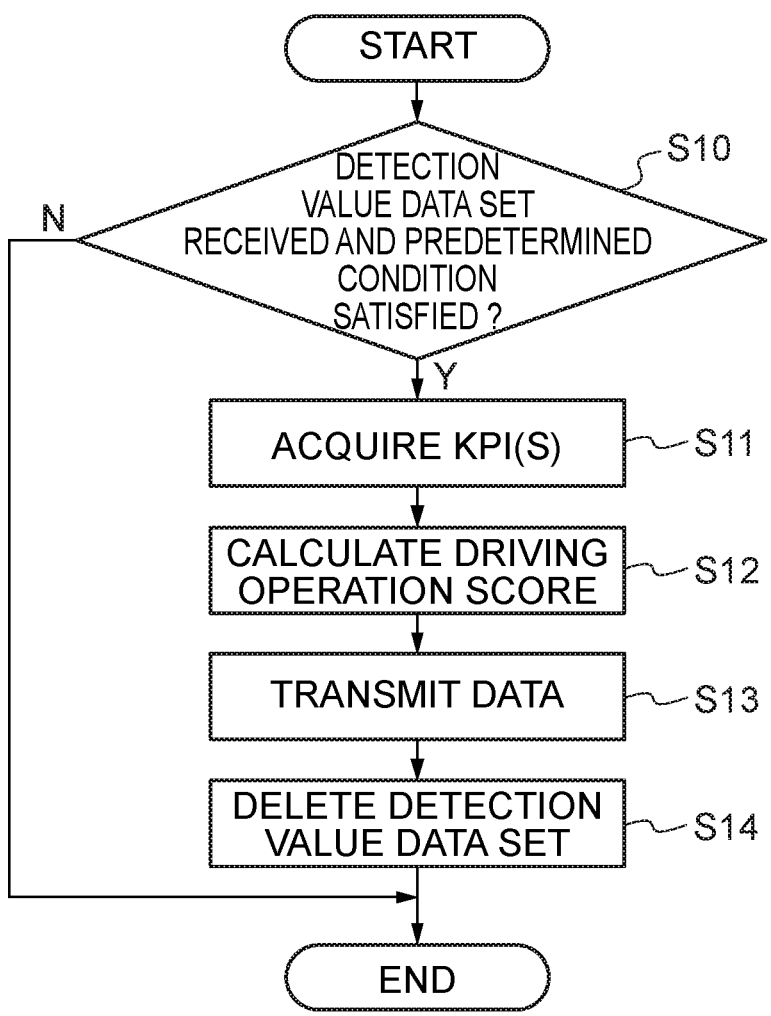
FIG. 8 is a flowchart illustrating processing that is executed by the second server.

When the result of the determination in S10 is No or the processing of S14 is complete, the second CPU temporarily ends the processing of the flowchart of FIG. 8.

Now, a flow of processing that is carried out by the CPU of the fourth server 18 (below referred to as "the fourth CPU") is described using the flowchart of FIG. 9. The fourth CPU executes the processing of the flowchart in FIG. 9 repeatedly, each time a predetermined duration passes.

In S20, the fourth CPU of the fourth server 18 makes a determination as to whether a display request has been transmitted to the communications interface of the fourth server 18 from the communications interface of the portable terminal 50, which is running the driving assessment display application. That is, the fourth CPU makes a determination as to whether there is an access operation from the portable terminal 50. This display request includes information relating to a vehicle ID associated with the portable terminal 50.

When the result of the determination in S20 is Yes, the fourth CPU proceeds to S21 and the communications interface of the fourth server 18 conducts communications with the third server 16. From the communications interface of the third server 16, the communications interface of the fourth server 18 receives data relating to a driving operation score corresponding with the vehicle ID that is associated with the portable terminal 50 transmitting the display request.

Figure 11:
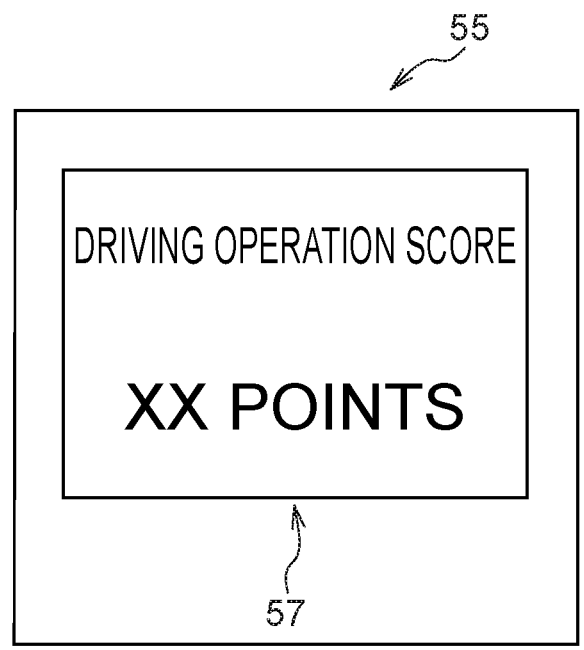
FIG. 11 is a diagram illustrating an image displayed at a display unit of the portable terminal.

When the processing of S21 ends, the fourth CPU proceeds to S22 and uses the data received in S21 to generate data representing a driving assessment results image 55 (see FIG. 11). The driving assessment results image 55 may be displayed by the display unit 51 of the portable terminal 50 running the driving assessment display application.

When the processing of S22 ends, the fourth CPU proceeds to S23 and the communications interface of the fourth server 18 transmits the data generated in S22 to the communications interface of the portable terminal 50.

Figure 9:
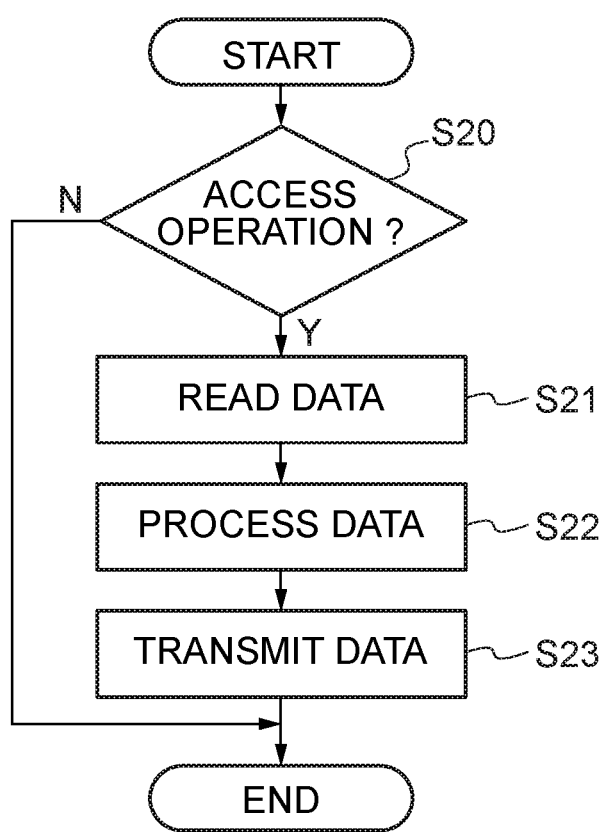
FIG. 9 is a flowchart illustrating processing that is executed by a fourth server.

When the result of the determination in S20 is No or the processing of S23 is complete, the fourth CPU temporarily ends the processing of the flowchart of FIG. 9.

Now, a flow of processing that is carried out by the CPU of the portable terminal 50 (below referred to as "the terminal CPU") is described using the flowchart of FIG. 10. The terminal CPU executes the processing of the flowchart in FIG. 10 repeatedly, each time a predetermined duration passes.

In S30, the terminal CPU makes a determination as to whether the driving assessment display application is running.

When the result of the determination in S30 is Yes, the terminal CPU proceeds to S31 and makes a determination as to whether the communications interface of the portable terminal 50 has received data representing the driving assessment results image 55 from the communications interface of the fourth server 18.

When the result of the determination in S31 is Yes, the terminal CPU proceeds to S32 and displays the driving assessment results image 55 at the display unit 51.

As shown in FIG. 11, the driving assessment results image 55 includes a score display portion 57. The driving operation score is displayed in the score display portion 57.

Figure 10:
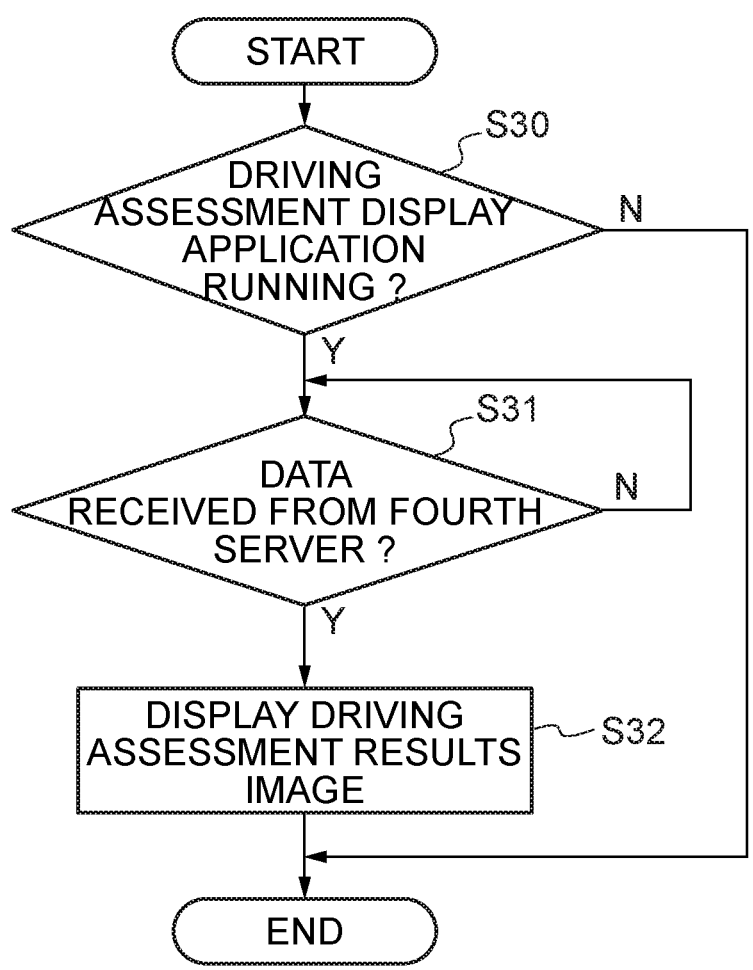
FIG. 10 is a flowchart illustrating processing that is executed by the portable terminal shown in FIG. 2.

When the result of the determination in S30 is No or the processing of S32 is complete, the terminal CPU temporarily ends the processing of the flowchart of FIG. 10.

As described above, the second server 14 according to the present exemplary embodiment makes a determination as to whether, in the scene duration Ts that is the duration between the first time t1 at which the turn signal lever 30D is moved from the neutral position to an operation position and the second time t2 at which the turn signal lever 30D is subsequently moved from the operation position to the neutral position, a difference between the maximum value Ymax and the minimum value Ymin of the yaw rate is at least the first threshold value and the absolute value of the maximum value Ymax of the yaw rate is at least the second threshold value.

When the vehicle 30 that is running along forward along a road with a curved shape or a linear shape performs a lane change on on that road, the difference between the maximum value Ymax and minimum value Ymin of the yaw rate of the vehicle 30 is likely to be the first threshold value or greater. In particular, if the first threshold value is 0.7°/s and the difference is at least that first threshold value, there is a high probability that the vehicle 30 running forward along a road with a curved shape or linear shape is performing a lane change on that road.

Figure 12:
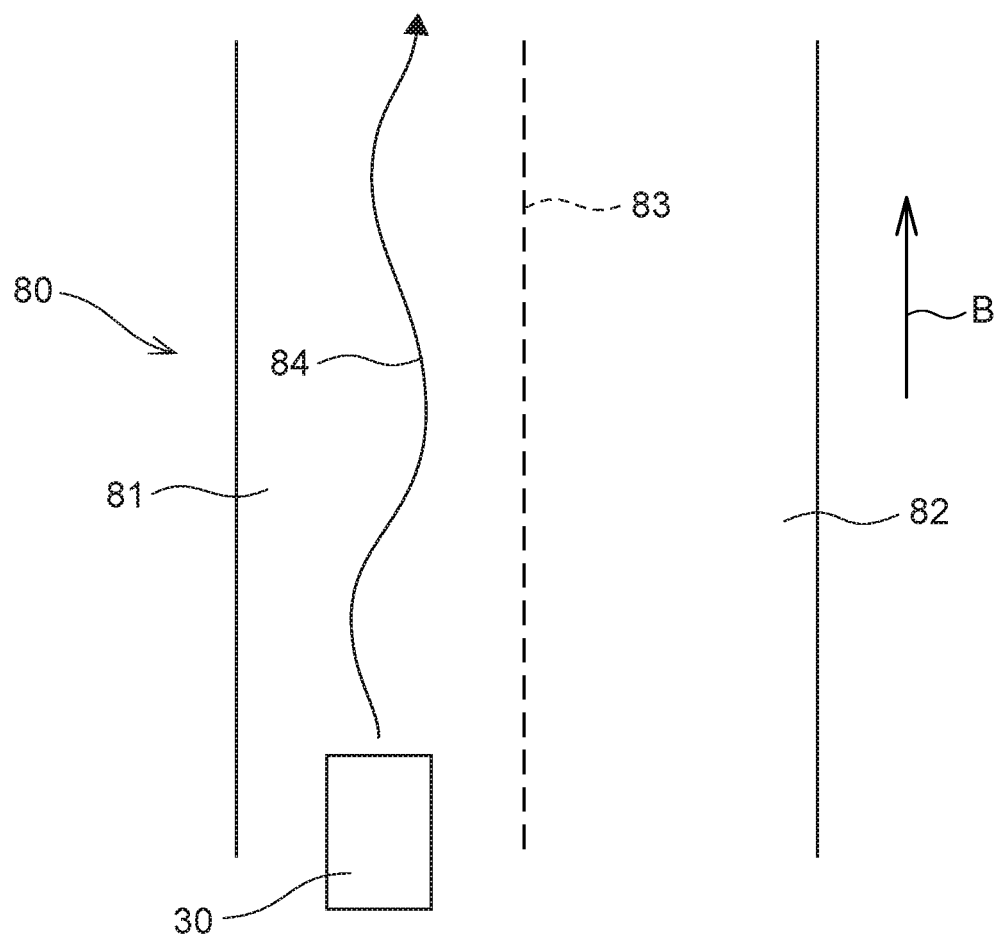
FIG. 12 is a schematic plan view illustrating a situation in which the vehicle is running along a high-speed road with a linear shape.

A further situation is anticipated in which, as shown in FIG. 12, the vehicle 30 is running along a road 80 with a linear shape. The road 80 includes a lane 81 and a lane 82, and the lane 81 and lane 82 are divided by a dividing line 83. The road 80 is a one-way road along which vehicles may run only in the direction of arrow B. When, for example, the vehicle 30 that is located in the lane 81 runs forward along the lane 81 following the path indicated by reference symbol 84 in FIG. 12, the absolute value of the maximum value Ymax of the yaw rate is likely to be less than the second threshold value. That is, when the vehicle 30 runs along the lane 81 with the steering angle of the steering wheel 30C being operated in small amounts in the clockwise direction and counterclockwise direction, the absolute value of the maximum value Ymax of the yaw rate is likely to be less than the second threshold value. Thus, when the absolute value of the maximum value Ymax of the yaw rate of the vehicle 30 is the second threshold value or greater, there is a high probability that the vehicle 30 is performing a lane change on a road with a linear shape. In particular, there is a high probability that the vehicle 30 is performing a lane change if the second threshold value is 0.7°/s and the absolute value of the maximum value Ymax of the yaw rate is the second threshold value or greater.

A situation is anticipated in which, as shown in FIG. 7, the vehicle 30 runs forward along the lane 72 following a running path indicated by reference symbol 70R2. The steering angle and yaw rate of the vehicle 30 in this case both have negative values. The running path 70R2 is parallel with the longitudinal direction of the high-speed road 70. When the steering angle of the vehicle 30 is negative and the absolute value of the steering angle is greater than if the vehicle 30 was running along the running path 70R2, the vehicle 30 may be running along a running path 70R3. When the vehicle 30 runs along the running path 70R3 in this manner, the absolute value of the maximum value Ymax of the yaw rate is at the second threshold value or greater. That is, if the first extraction condition were satisfied when only conditions 4 and 5 are satisfied, there would be a high probability of the second server 14 erroneously determining that the vehicle 30 running along the running path 70R3 in FIG. 7 is conducting a lane change. However, when the vehicle 30 runs along the running path 70R3, condition 3 is not satisfied. Therefore, in the present exemplary embodiment, the first extraction condition is satisfied when conditions 3 to 5 are satisfied, and the probability of the second server 14 making this erroneous determination is low.

Therefore, the second server 14 may determine whether or not the vehicle 30 running along a road with a curved shape or a linear shape conducts a lane change The second server 14 also makes a determination as to whether the average speed VA of the vehicle 30 in the scene duration Ts is at least the third threshold value. When the average speed VA is the third threshold value or more, there is a high probability that the vehicle 30 is running along a road with a speed limit that is a predetermined value and that no congestion is occurring. Therefore, the second server 14 may determine whether or not the vehicle 30 that is running along a road with a speed limit that is the predetermined value and on which there is no congestion conducts a lane change.

The second server 14 determines that the scene end condition is satisfied when the scene duration Ts is greater than the fourth threshold value. That is, the second server 14 does not make a determination as to whether the vehicle 30 is conducting a lane change when the scene duration Ts is the fourth threshold value or less. It is thought unlikely that the vehicle 30 would perform a lane change with the position of the turn signal lever 30D being switched from the neutral position to the operation position within a duration of the scene duration Ts that is the prespecified duration or less. In particular, if the fourth threshold value is 1.5 seconds, the probability of a lane change being conducted in less than the prespecified duration is thought to be low. Therefore, the second server 14 may determine with high accuracy whether or not the vehicle 30 conducts a lane change with the turn signal lever 30D being switched from the neutral position to an operation position.

In the present exemplary embodiment, driving assessment is carried out using driving operation scores (KPIs). Therefore, a driver viewing the driving assessment results image 55 may easily understand characteristics of their own driving operations.

The KPI acquisition section 143 uses only specific detection values in a detection value data set to calculate a KPI. Therefore, a computation load on the KPI acquisition section 143 is smaller than if the KPI were calculated using all of the detection value data set. Thus, a computation load of the driving assessment device 10 is smaller.

Above, the driving assessment device 10, system 100, driving assessment method and program according to the exemplary embodiment are described, but the designs thereof may be modified as appropriate within a scope not departing from the gist of the present disclosure.

The driving assessment results image 55 may include time information representing times at which behaviors of the vehicle 30 that are targets of driving assessment occurred and position information representing places at which these behaviors occurred. The driving assessment results image 55 may also include map data, and the map data may include information representing the times and places at which these behaviors occurred. Accordingly, the driver seeing the driving assessment results image 55 displayed at the display unit 51 may recognize the times and places at which they conducted the driving operations relating to these behaviors.

Condition 5 may be omitted.

The driving assessment device 10 may be embodied with a configuration different from that described above. For example, the first server 12, the second server 14, the third server 16 and the fourth server 18 may be embodied by a single server. In this configuration, for example, a hypervisor may be employed and the interior of this server may be virtually divided into regions respectively corresponding to the first server 12, the second server 14, the third server 16 and the fourth server 18.

The driving assessment device 10 need not be connected to the Internet, in which case, for example, detection value data sets acquired from the vehicle are recorded on a portable recording medium (for example, a USB Flash drive) and the detection value data sets in the recording medium are copied to the first server 12.

In place of the GPS receiver 39, the vehicle 30 may be equipped with a receiver that is capable of receiving information from satellites of a global navigation satellite system other than GPS (for example, GALILEO).

The ECU 31 of the vehicle 30 may feature functions corresponding to the scene extraction section 142, the KPI acquisition section 143 and the score calculation section 144.

Additional Remarks

A driving assessment device of the present disclosure may be an arbitrary combination of the following configurations 1 to 7.

<Configuration 1> A driving operation determiner that, on the basis of lever operation information representing whether or not a turn signal lever of a vehicle is operated and yaw rate information representing a yaw rate of the vehicle, makes a determination as to whether, in an identified duration between a first time and a second time, a difference between a maximum value and a minimum value of the yaw rate is at least a first threshold value and the absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

<Configuration 2> A driving operation determiner that, on the basis of vehicle speed information representing a vehicle speed of the vehicle, makes a determination as to whether an average vehicle speed of the vehicle in the identified duration is at least a third threshold value.

<Configuration 3> A driving operation determiner in which the identified duration is greater than a fourth threshold value.

<Configuration 4> A driving operation determiner in which the first threshold value is 0.7°/s.

<Configuration 5> A driving operation determiner in which the second threshold value is 0.7°/s.

<Configuration 6> A driving operation determiner in which the third threshold value is 80.0 km/h.

<Configuration 7> A driving operation determiner in which the fourth threshold value is 1.5 s.

A driving assessment system of the present disclosure may be a combination of configuration 8 described below and one or more of configurations 1 to 7.

<Configuration 8> A driving operation determination system including: the driving operation determiner; a lever position detection portion that acquires the lever operation information; and a yaw rate sensor that acquires the yaw rate information.

A driving assessment method of the present disclosure may be a combination of configuration 9 described below and one or more of configurations 1 to 8.

<Configuration 9> A driving operation determination method including a step of, on the basis of lever operation information representing whether or not a turn signal lever of a vehicle is operated and yaw rate information representing a yaw rate of the vehicle, making a determination as to whether, in an identified duration between a first time and a second time, a difference between a maximum value and a minimum value of the yaw rate is at least a first threshold value and the absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

A program of the present disclosure may be a combination of configuration 10 described below and one or more of configurations 1 to 8.

<Configuration 10> A program that is executable by a computer to execute processing including, on the basis of lever operation information representing whether or not a turn signal lever of a vehicle is operated and yaw rate information representing a yaw rate of the vehicle, making a determination as to whether, in an identified duration between a first time and a second time, a difference between a maximum value and a minimum value of the yaw rate is at least a first threshold value and the absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

An object of the present disclosure is to provide a driving operation determiner, a driving operation determination system, a driving operation determination method and a memory medium memorizing a program that may determine whether or not a vehicle running along a road with a curved shape conducts a lane change.

A first aspect of the disclosure is a driving operation determiner that includes: a memory; and a processor coupled to the memory, the processor being configured to: based on lever operation information representing whether or not a turn signal lever of a vehicle is operated, and based on yaw rate information representing a yaw rate of the vehicle, make a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

Regardless of whether a road along which the vehicle is running has a linear shape or a curved shape, the absolute value of difference between the maximum value and minimum value of the yaw rate of the vehicle when performing a lane change is likely to the first threshold value or greater.

When the absolute value of the maximum value of the yaw rate of the vehicle that is running along a road with a linear shape is less than the second threshold value, there is a high probability that the vehicle is running along the road without performing a lane change.

Therefore, the first aspect may determine whether or not a vehicle running along a road with a curved shape conducts a lane change.

A second aspect of the present disclosure is the driving operation determiner according to the first aspect, wherein the processor is configured to, based on vehicle speed information representing a vehicle speed of the vehicle, make a determination as to whether an average vehicle speed of the vehicle in the identified duration is at least a third threshold value.

A driving operation determiner according to a second aspect makes a determination as to whether an average vehicle speed of the vehicle in the identified duration is at least a third threshold value. When the average speed of the vehicle in the identified duration is the third threshold value or greater, there is a high probability that this vehicle is running along a road with a speed limit that is a predetermined value. Therefore, the second aspect may determine whether or not a vehicle running along a road with a speed limit that is a predetermined value conducts a lane change.

A third aspect of the present disclosure is the driving operation determiner according to the first or second aspect, wherein the identified duration is greater than a fourth threshold value.

In the third aspect, the identified duration is greater than a fourth threshold value. The vehicle is unlikely to perform a lane change with the turn signal lever being switched from the non-operation state to the operation state within a duration that is the fourth threshold value or less. Therefore, the third aspect may determine whether or not a vehicle running along a road with a curved shape conducts a lane change with the turn signal lever being switched from the non-operation state to the operation state.

A fourth aspect of the present disclosure is the driving operation determiner according to the first or second aspect, wherein the first threshold value is 0.7°/s.

In the fourth aspect, the first threshold value is 0.7°/s. Regardless of whether a road the vehicle is running along has a linear shape or a curved shape, the difference between the maximum value and minimum value of the yaw rate of the vehicle when performing a lane change is likely to be 0.7°/s or more. Therefore, the fourth aspect may determine with high accuracy whether or not a vehicle running along a road with a curved shape conducts a lane change.

A fifth aspect of the present disclosure is the driving operation determiner according to the first or second aspect, wherein the second threshold value is 0.7°/s.

In the fifth aspect, the second threshold value is 0.7°/s. When the absolute value of the maximum value of the yaw rate of the vehicle that is running along a road with a linear shape is less than 0.7°/s, there is a high probability that this vehicle is running along the road without performing a lane change. Therefore, the fifth aspect may determine with high accuracy whether or not a vehicle running along a road with a curved shape conducts a lane change.

A sixth aspect of the present disclosure is the driving operation determiner according to the second aspect, wherein the third threshold value is 80.0 km/h.

In the sixth aspect, the third threshold value is 80.0 km/h. When the average vehicle speed of the vehicle in the identified duration is 80.0 km/h or more, there is a high probability that the vehicle is running along a road with a speed limit that is a predetermined value. Therefore, the sixth aspect may determine with high accuracy whether or not a vehicle running along a section with a curved shape of a road with a speed limit that is the predetermined value conducts a lane change.

A seventh aspect of the present disclosure is the driving operation determiner according to the third aspect, wherein the fourth threshold value is 1.5 s.

In the seventh aspect, the fourth threshold value is 1.5 s. A vehicle is unlikely in practice to perform a lane change with the turn signal lever being switched from the non-operation state to the operation state within a duration that is 1.5 s or less. Therefore, the seventh aspect may determine with high accuracy whether or not a vehicle running along a road with a curved shape conducts a lane change with the turn signal lever being switched from the non-operation state to the operation state.

An eighth aspect of the present disclosure is a driving operation determination system that includes: the driving operation determiner according to the first or second aspect; a turn signal switch that acquires the lever operation information; and a yaw rate sensor that acquires the yaw rate information.

A ninth aspect of the present disclosure is a driving operation determination method that includes: by a processor, based on lever operation information representing whether or not a turn signal lever of a vehicle is operated, and based on yaw rate information representing a yaw rate of the vehicle, making a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

A tenth aspect of the present disclosure is a non-transitory computer readable storage medium storing a program that is executable by a computer to perform processing that includes: based on lever operation information representing whether or not a turn signal lever of a vehicle is operated, and based on yaw rate information representing a yaw rate of the vehicle, making a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time.

A driving operation determiner, driving operation determination system, driving operation determination method and memory medium memorizing a program according to the present disclosure may determine whether or not a vehicle running along a road with a curved shape conducts a lane change.

What is claimed is:

1. A driving operation determination system comprising:
    a vehicle comprising:
        a turn signal switch that acquires lever operation information;
        a yaw rate sensor that acquires yaw rate information; and
        a drive source;
    a driving operation determiner comprising:
        a memory; and
        a processor coupled to the memory, the processor being configured to:
            based on the lever operation information representing whether or not a turn signal lever of the vehicle is operated by a user, and based on the yaw rate information representing a yaw rate of the vehicle, make a determination as to whether, within a predetermined identified duration between a first time and a second time, a difference between a maximum value and a minimum value of the yaw rate is at least a first threshold value and an absolute value of the maximum value of the yaw rate is at least a second threshold value, the turn signal lever being switched from a neutral position to a first position or a second position at the first time, and the turn signal lever being switched from the first position or the second position to the neutral position at the second time subsequent to the first time; and
            determine a first extraction condition being satisfied based on at least the difference being at least the first threshold value and the absolute value being at least the second threshold value; and
        in response to satisfying the first extraction condition, the vehicle conducts a lane change from a first lane to a second lane while running forward on a road that is formed in a curved shape by controlling the drive source of the vehicle.

2. The driving operation determination system according to claim 1, wherein the processor is configured to, based on vehicle speed information representing a vehicle speed of the vehicle, make a determination as to whether an average vehicle speed of the vehicle in the identified duration is at least a third threshold value.

3. The driving operation determination system according to claim 1, wherein the identified duration is greater than a fourth threshold value.

4. The driving operation determination system determiner according to claim 1, wherein the first threshold value is 0.7°/s.

5. The driving operation determination system determiner according to claim 1, wherein the second threshold value is 0.7°/s.

6. The driving operation determination system according to claim 2, wherein the third threshold value is 80.0 km/h.

7. The driving operation determination system according to claim 3, wherein the fourth threshold value is 1.5 s.

8. A driving operation determination method comprising:
    by a processor,
    based on lever operation information representing whether or not a turn signal lever of a vehicle is operated, and based on yaw rate information representing a yaw rate of the vehicle, making a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time, the vehicle including a turn signal switch that acquires the lever operation information, a yaw rate sensor that acquires the raw rate information, and a drive source;
    determining a first extraction condition being satisfied based on at least the difference being at least the first threshold value and the absolute value being at least the second threshold value; and
    in response to satisfying the first extraction condition, conducting by a vehicle a lane change from a first lane to a second lane while running forward on a road that is formed in a curved shape by controlling the drive source of the vehicle.

9. A non-transitory computer readable storage medium storing a program that is executable by a computer to perform processing comprising:
    based on lever operation information representing whether or not a turn signal lever of a vehicle is operated, and based on yaw rate information representing a yaw rate of the vehicle, making a determination as to whether, in an identified duration between a first time and a second time, a difference between a maximum value and a minimum value of the yaw rate is at least a first threshold value and an absolute value of the maximum value of the yaw rate is at least a second threshold value, the turn signal lever being switched from a non-operation state to an operation state at the first time, and the turn signal lever being switched from the operation state to the non-operation state at the second time subsequent to the first time, the vehicle including a turn signal switch that acquires the lever operation information, a yaw rate sensor that acquires the raw rate information, and a drive source;
    determining a first extraction condition being satisfied based on at least the difference being at least the first threshold value and the absolute value being at least the second threshold value; and
    in response to satisfying the first extraction condition, conducting by a vehicle a lane change from a first lane to a second lane while running forward on a road that is formed in a curved shape by controlling the drive source of the vehicle.

* * * * *